UNITED STATES PATENT OFFICE.

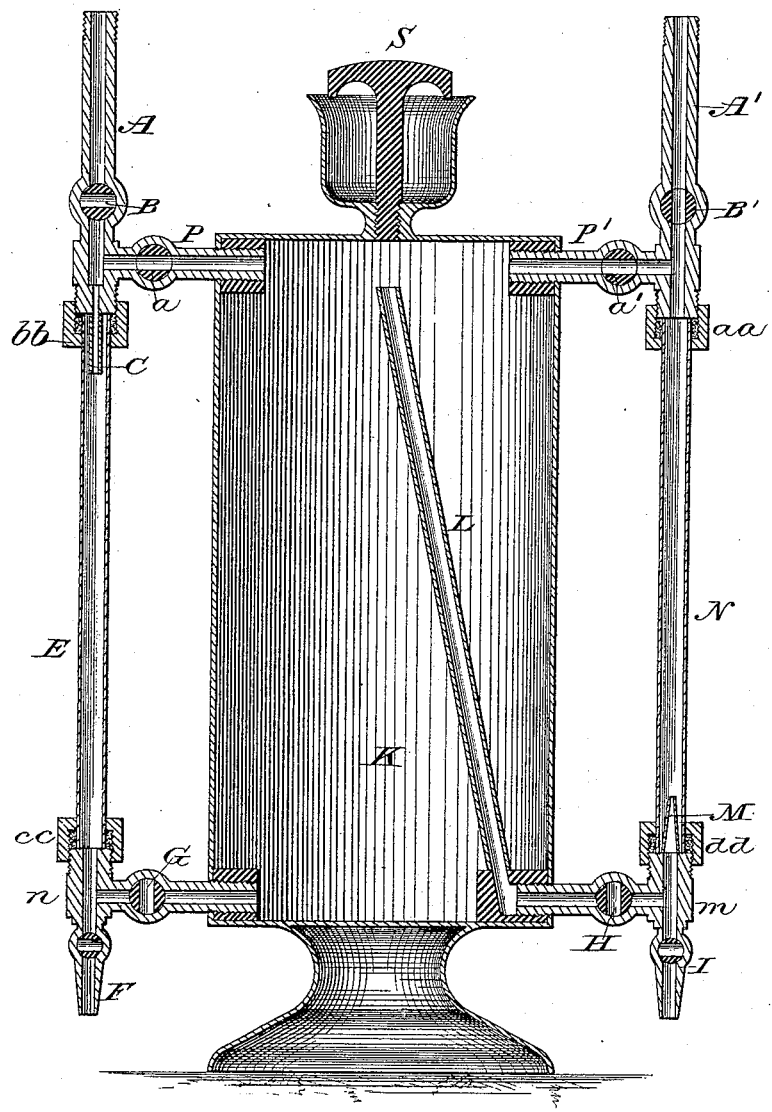

CHARLES H. HARRUB, OF WATERBURY, CONNECTICUT, ASSIGNOR TO THE WATERBURY BRASS COMPANY, OF SAME PLACE.

LUBRICATOR.

SPECIFICATION forming part of Letters Patent No. 253,282, dated February 7, 1882.

Application filed June 26, 1879.

*To all whom it may concern:*

Be it known that I, CHARLES H. HARRUB, a citizen of the United States, residing at Waterbury, in the county of New Haven and State of Connecticut, have invented certain new and useful Improvements in Oil-Cups or Lubricators; and I do hereby declare the following to be a full, clear, and exact description of the invention, such as will enable others skilled in the art to which it appertains to make and use the same, reference being had to the accompanying drawing, and to the letters of reference marked thereon, which forms a part of this specification.

My invention has for its object to provide an oil-cup or lubricator of an improved and novel construction, which is adapted to be connected to the steam-pipe which conveys steam to the cylinder of an engine, and whereby the oil contained in said cup or lubricator becomes diffused with the steam in its passage, and is automatically supplied thereby to said cylinder in such quantity as the varying work of the engine may require; and it consists essentially of an oil receptacle or reservoir provided at its upper part, on each side, with upwardly-projecting tubes or pipes, which are adapted to be attached to and open into the steam-pipe which supplies the steam to the cylinder of the engine, said tubes or pipes being also connected to and opening into the upper portion of the oil-reservoir by means of short bends or pipes arranged at right angles thereto, intermediate glass cylinders connecting the lower ends of said pipes or tubes with the upper ends of L-shaped pipes, which are arranged at and open into the bottom of the oil-reservoir on each side, said oil-receptacle being also provided with a supply-opening and with an inner slanting pipe, open at its top and connecting at the bottom with one of the L-shaped pipes, and the general construction of the whole device being such that when it is in operation the supply of oil from one side of the oil-receptacle to the cylinder of the engine is governed by the supply of globules of water upon the opposite side of said receptacle, all as will be hereinafter more fully described, and specifically designated in the claims.

In the accompanying drawing, the figure represents a vertical longitudinal section of my invention.

K represents the oil receptacle or reservoir, which may be of any suitable shape, and provided with the supply-opening and a closing-plug, S, as in the usual manner.

A A' represent two upwardly-extending pipes or tubes, one on each side of said oil-receptacle, and connected thereto and opening into the upper part of the same by means of the short bends or pipes P P', arranged at right angles thereto. The upper parts of the pipes or tubes A A' are adapted to be connected to and open into the steam-pipe which conveys steam to the cylinder of the engine, said pipes or tubes being provided with suitable stop-cocks, B B', and the connecting bends or pipes P P' with similar stop-cocks, *a a'*, as fully shown in the drawing. The lower ends of the pipes or tubes A A' are also provided with screw-threads to receive the stuffing-boxes *a a* and *b b*, one on each side of the oil-receptacle K, as shown.

Near the bottom of the oil-receptacle, and opening therein, is provided the L-shaped pipes *n* and *m*, one on each side, which are provided with the pet-cocks F and I, and with the stop-cocks G and H, respectively, the upwardly-projecting ends of said pipes being also provided with screw-threads to receive the stuffing-boxes *c c* and *d d*.

E represents an intermediate glass tube, the ends of which are securely held within the stuffing-boxes *b b* and *c c* upon one side of the oil-receptacle, while N represents a similar tube upon the opposite side, and held in place by the stuffing-boxes *a a* and *d d* in such a manner as to be water-tight.

At the lower part of the pipe or tube A is provided a tapering nozzle, C, which projects down into the glass tube E, while a similar nozzle, M, is attached to the upper part of the pipe *m*, and projects upwardly into the glass tube N, as clearly shown in the drawing.

The interior of the oil receptacle or reservoir K is provided with an inclined or slanting pipe, L, extending nearly to the top of the said reservoir, its upper part being open and the lower part being connected to and opening into the L-shaped pipe m at one side of the said receptacle.

The construction of my invention being as described, the operation is as follows: The reservoir or receptacle K is filled with oil, through the usual supply-opening, up to the top of the inclined pipe L, and the plug S then inserted in place. As the reservoir becomes filled to the proper height the oil rises up in the glass tube E through the lower pipe, n, until it surrounds the nozzle C. The stop-cocks B B', which until now have been closed, are opened to admit the water condensed from the steam, which enters pipes A A', the water in pipe A passing down into the nozzle C, the stop-cocks a a' in the short bends or pipes P P' remaining closed. The water in pipe A issues in globules from the said nozzle C, and, being heavier than the oil in the glass tube E, descends through the same and passes into the bottom of the reservoir K through the pipe n, thereby floating up a like amount of the oil in said reservoir and allowing it to pass down through the inclined pipe L into the L-shaped pipe m, the stop-cock H being open, and as the operation goes on passes out through the nozzle M in globules, which, being lighter than the water contained in the glass tube N and pipe A', rises up through the same and into the steam-pipe, and is conducted from thence to the cylinder of the engine. This operation is repeated as fast as the globules of water pass downward from the nozzle C, floating a like amount of oil up through the nozzle M into the steam-pipe for transmission to the cylinder, and the number of either the water or oil globules issuing from the said nozzles can be readily regulated by the stop-cocks B and H, the operation being readily observed through the glass tubes E and N. The cut-off of one liquid by the other as it issues in one instance from the nozzle C and in the other from the nozzle M is very sure and accurate, enabling the engineer to regulate the supply of oil, as the varying work of the engine may require, by simply turning the stop-cocks B and H to the proper position.

The fact that the globules of water descending through the oil on the one side and the globules of oil ascending through the water on the opposite side are clearly visible through the glass tubes E and N, even at several hundred feet, enables the engineer to readily discover any failure of the machine to do its work by reason of any accidental clogging of the nozzle M, or from other causes. Should the nozzle M become clogged or obstructed at any time it can be easily cleared by closing the stop-cock H, opening the pet-cock I, and blowing steam down through the tube N from the steam-pipe, or by thrusting a wire up through the pet-cock I and nozzle M. The nozzle M fulfills an important office, in that it causes the globules of oil issuing therefrom to pass vertically upward through the water in the tube N, which would otherwise run up the glass in a confused and inaccurate manner and render the operation less clear to the sight.

The oil-reservoir and its connecting-pipes may be readily flushed or cleaned out by opening the stop-cocks a a' and G and H, and the pet-cocks F and I, and closing a suitable stop-cock arranged in the main steam-pipe at a point between where the two pipes A A' connect therewith, thereby diverting the current of steam down into the reservoir and its connections.

Having thus described my invention, what I claim as new and useful is—

1. A lubricator consisting of the oil receptacle or reservoir K, provided with the two pipes A A', glass cylinders E and N, and lower pipes, n and m, arranged respectively upon opposite sides and connecting with the interior of said reservoir and the inclined pipe L, arranged therein, and with the steam-pipe of an engine, substantially in the manner and for the purpose specified.

2. In a lubricator constructed as hereinbefore described, the oil-reservoir K, provided with the pipes A A', having bends or small pipes P P', L-shaped pipes n m, glass tubes E and N, and interior pipe, L, in combination with the steam-pipe of an engine, substantially as and for the purpose specified.

3. In a lubricator, the pipes A A', provided with the stop-cocks B B', pipes P P', provided with the stop-cocks a a', pipes n and m, provided with the stop-cocks G and H and pet-cocks F and I, intermediate glass tubes, E and N, having nozzles C and M, projecting respectively therein, in combination with an oil-reservoir provided with the inclined pipe L, and with the steam-pipe of an engine, substantially as and for the purpose specified.

4. In a lubricator, the oil-reservoir K, provided with the pipes A A' and P P', L-shaped pipes n and m, and interior pipe, L, glass tubes E and N, and nozzles C and M, the several parts being adapted for operation in connection with the steam-pipe of an engine, substantially as and for the purpose specified.

5. In a lubricator, the pipes A' and P' and m, having the nozzle M and glass cylinder N, arranged within the stuffing-boxes a a and d d, in combination with the reservoir K, inclined pipe L, pipes A, P, and n, and glass cylinder E, arranged within the stuffing-boxes b b and c c, substantially as and for the purpose specified.

CHAS. H. HARRUB.

Witnesses:
GEO. H. COWELL,
FRANK C. HOLMES.